(12) United States Patent
Choi

(10) Patent No.: US 10,744,723 B2
(45) Date of Patent: Aug. 18, 2020

(54) METHOD FOR PRODUCING SANITARY COVER FOR BEVERAGE CAN

(71) Applicant: Gyeong-Bok Choi, Incheon (KR)

(72) Inventor: Gyeong-Bok Choi, Incheon (KR)

( * ) Notice: Subject to any disclaimer, the term of this patent is extended or adjusted under 35 U.S.C. 154(b) by 0 days.

(21) Appl. No.: 15/778,313

(22) PCT Filed: Nov. 21, 2016

(86) PCT No.: PCT/KR2016/013386
§ 371 (c)(1),
(2) Date: May 23, 2018

(87) PCT Pub. No.: WO2017/090941
PCT Pub. Date: Jun. 1, 2017

(65) Prior Publication Data
US 2018/0345590 A1  Dec. 6, 2018

(30) Foreign Application Priority Data
Nov. 23, 2015  (KR) .......................... 10-2015-0164151

(51) Int. Cl.
*B29C 65/00* (2006.01)
*B29C 51/00* (2006.01)
(Continued)

(52) U.S. Cl.
CPC .............. *B29C 65/747* (2013.01); *B26D 1/00* (2013.01); *B26D 7/10* (2013.01); *B26F 1/24* (2013.01); *B26F 3/06* (2013.01); *B29C 51/26* (2013.01); *B29C 51/42* (2013.01); *B29C 59/00* (2013.01); *B29C 63/0056* (2013.01); *B29C 63/0073* (2013.01); *B29C 63/423* (2013.01); *B29C 63/44* (2013.01); *B29C 66/0346* (2013.01);
(Continued)

(58) Field of Classification Search
CPC ..... B29C 63/0056; B29C 63/18; B65C 3/065; B67B 5/03; B26D 1/5535; B26D 1/553; B26D 1/5475
See application file for complete search history.

(56) References Cited

U.S. PATENT DOCUMENTS 2,261,875 A * 11/1941 Dunn ................. B65D 55/0854
  215/246
3,871,943 A *  3/1975 Zodrow .................... B65C 3/22
  156/521

FOREIGN PATENT DOCUMENTS

JP      2010126209    6/2010
KR     20130110736   10/2013

OTHER PUBLICATIONS

English machine translation of KR2013011736 to Choi, 3 pages, Oct. 2013. (Year: 2013).*
(Continued)

*Primary Examiner* — Linda L Gray
(74) *Attorney, Agent, or Firm* — IPLA P.A.; James E. Bame

(57) ABSTRACT

A method for manufacturing a sanitary cover for a beverage can and relates to a technique for forming a cutting line along a circumferential surface of a sanitary cover while the sanitary cover is covering a beverage can, thereby maximizing the production efficiency of the sanitary cover having improved functionality. Also, the technique which, in three-dimensionally forming a cutting line as such, can carry out the process of forming the cutting line easily and rapidly via a simple structure, thereby increasing the production efficiency even further.

5 Claims, 8 Drawing Sheets

(51) Int. Cl.
*B29C 59/00* (2006.01)
*B29C 63/00* (2006.01)
*B26D 7/00* (2006.01)
*B26F 1/00* (2006.01)
*B26D 1/00* (2006.01)
*B26F 3/00* (2006.01)
*B29C 65/74* (2006.01)
*B29C 51/42* (2006.01)
*B29C 51/26* (2006.01)
*B26D 7/10* (2006.01)
*B26F 1/24* (2006.01)
*B65D 17/28* (2006.01)
*B29C 63/44* (2006.01)
*B65D 51/18* (2006.01)
*B29C 63/42* (2006.01)
*B26F 3/06* (2006.01)
*B29D 99/00* (2010.01)
*B29L 31/00* (2006.01)

(52) U.S. Cl.
CPC .......... *B29C 66/71* (2013.01); *B29D 99/0096* (2013.01); *B65D 17/401* (2018.01); *B65D 51/185* (2013.01); *B29C 63/0069* (2013.01); *B29C 2793/009* (2013.01); *B29C 2793/0045* (2013.01); *B29L 2031/712* (2013.01); *B29L 2031/717* (2013.01); *B65D 2251/0031* (2013.01); *B65D 2251/0071* (2013.01); *B65D 2517/0098* (2013.01)

(56) References Cited

OTHER PUBLICATIONS

English machine translation of JP20100126209 to Kayama, 12 pages, Jun. 2010. (Year: 2010).*

* cited by examiner

METHOD FOR PRODUCING SANITARY COVER FOR BEVERAGE CAN

BACKGROUND

The present invention relates to a method for manufacturing a sanitary cover mounted to cover around a beverage outlet of a beverage can to prevent contamination of the surface of the beverage can during the distribution process and carrying process of the beverage can, and more particularly, to a method for manufacturing a sanitary cover, which is capable of forming cutting lines in a state where the sanitary cover is covered on an upper end portion of the beverage can in such a way that the cutting lines are smoothly formed in a curved form along a curved edge of the top of the peripheral surface of the beverage can so that the cutting lines of the sanitary cover can be formed in the curved from along the peripheral surface of the sanitary cover, thereby enhancing productivity of the sanitary cover, which is convenience in use.

Recently, some of beverage products are manufactured in a state where a sanitary cover of a vinyl material is covered on an upper end portion of a beverage container in order to prevent that foreign matters are stained on an upper end portion of the beverage container, which a user's mouth touches, during the distribution process.

The sanitary cover covers a top edge of a lid of the beverage container and the upper circumferential surface of a container body, and a cutting band is formed from the front top edge of the circumferential surface of the sanitary cover to the bottom edge in a vertically straight direction, so that the sanitary cover is cut vertically to be separated from the beverage container when a user holds the cutting band and cuts vertically.

However, such a cutting band which is simply formed in the vertical direction is inconvenient because the sanitary cover must be completely separated from the beverage container and discarded after being cut off.

Moreover, the conventional sanitary cover is also inconvenient because the cutting band must be separated from the beverage container after being cut off.

Especially, in spite of such inconvenience, because it is impossible to form the cutting band three-dimensionally during the manufacturing process, the cutting band must be formed in the vertically direction.

Recently, the same inventor as the present invention has proposed a sanitary cover including: a periphery cover surrounding the peripheral surface of a beverage can; a lid part integrally which is connected with an upper end portion of the periphery cover and covers the upper surface of the beverage can; cutting lines formed along the peripheral surface of the periphery cover and spaced apart from each other at a vertical interval; a cutting band located between the cutting lines to cut the periphery cover along the cutting lines; a noncut section formed between a start point and an end point of the cutting lines of the peripheral surface of the periphery cover; and an extension section formed on the periphery cover and extending lower than the end point of the cutting lines.

Because the cutting line is formed in a curved form along the peripheral surface of the periphery cover and is cut along a circular line of a boundary point between the lid part and the periphery cover, the lid part is naturally tilted while a user tears off the cutting band along the cutting line and the sanitary cover is not completely separated from the beverage can even though tearing of the cutting band is finished. Therefore, the cited reference can solve the problem of the conventional arts that the user has to tilt the sanitary cover by hand, and there is no need to dispose of the sanitary cover because the sanitary cover is not completely separated from the beverage can.

However, the sanitary cover has a disadvantage in that a cutting line forming step during a manufacturing process is complicated because the cutting lines are formed not only on the peripheral surface of the periphery cover but also along the boundary point between the periphery cover and the lid part, namely, along the upper end edge of the beverage container.

Particularly, because the cutting lines must be formed in the state where the sanitary cover covers the beverage can during the manufacturing process, it is more difficult to make such a three-dimensionally curved line structure.

SUMMARY OF THE INVENTION

Accordingly, the present invention has been made in view of the above-mentioned problems occurring in the prior art, and it is an object of the present invention to provide a method for manufacturing a sanitary cover for a beverage can, which can form a cutting line along the peripheral surface of a sanitary cover three-dimensionally in a state where the sanitary cover covers the beverage can, thereby maximizing the production efficiency of the sanitary cover with improved functionality.

It is another object of the present invention to provide a method for manufacturing a sanitary cover for a beverage can, which can easily and rapidly carry out the process of forming the cutting line three-dimensionally via a simple structure, thereby increasing the production efficiency even further.

To accomplish the above object, according to the present invention, there is provided a method for manufacturing a sanitary cover for a beverage can including: a cover mounting step of covering a vinyl cover, which is opened at a lower end portion and enclosed in all directions except the lower end portion, from an upper end portion to a middle portion of the beverage can; a cover adhering step of contracting the entire vinyl cover by heating the covered vinyl cover so as to be adhered on the surface of the beverage can; and a three-dimensional cutting line forming step of forming a first cutting line perforated at predetermined intervals along a boundary point between a lid cover and a periphery cover of the vinyl cover, which cover the upper surface of the beverage can, and a second cutting line perforated at predetermined intervals along the peripheral surface of the periphery cover, which surrounds the peripheral surface of the beverage can, by a cutting line forming part while the beverage can and the vinyl cover move and pass through the cutting line forming part, wherein in the cutting line forming step, the second cutting line is formed in a circle along the peripheral surface from one side of the peripheral surface of the periphery cover but is formed only near to the start point of the second cutting line, and the first cutting line is formed in a circle along the boundary point between the periphery cover and the lid cover but is formed only to the opposite point of the start point of the first cutting line.

Moreover, the cutting line forming part includes: a support plate, which is a plate having a front-and-rear length and has a curved portion formed on the inner surface to have the same shape as the vertical edge line of one side of the beverage can in the cross section; and a perforating part formed on the inner surface of the support plate along a virtual route where the first cutting line and the second cutting line, which will be formed on the vinyl cover, are deployed on a plane, wherein one side edge of the beverage can comes into contact with the inner surface of the support plate, the beverage can moves toward the front while rotating in the state where the side edge of the beverage can gets in contact with the curved part, and during the step, the perforating part perforates the surfaces of the periphery cover and the lid cover so that holes are formed along the formation routes of the first cutting line and the second cutting at predetermined intervals.

Furthermore, the perforating part is formed such that electrical heating lines are arranged on the inner surface of the support plate to be spaced apart from each other at a predetermined interval along a virtual route (13) where the first and second cutting lines are deployed and to be exposed. The heating lines come into contact with the surface of the periphery cover and the surface of the lid cover while the beverage can rotates and moves toward the front, and contact points are melted and perforated by heat.

Additionally, the electrical heating lines perforate the inner surface of the support plate in zigzags along the virtual route (13) where the first and second cutting lines are deployed.

Moreover, the perforating part is made in the form of cutting blades, and the cutting blades are protrudingly arranged on the inner surface of the support plate to be spaced apart from each other at a predetermined interval along a virtual route (13) where the first and second cutting lines are deployed. The cutting blades come into contact with the surface of the periphery cover and the surface of the lid cover while the beverage can rotates and moves toward the front, and contact points are cut and perforated by the cutting blades.

Furthermore, the perforating part has an auxiliary cutting part for cutting around the start point of the first cutting line, and the auxiliary cutting part is formed from the start point of the first cutting line to the vicinity of the start point of the first cutting line of the boundary point between the periphery cover and the lid cover.

As described above, according to an embodiment of the present invention, while the beverage can rotates and passes the cutting line forming part in the state where the vinyl cover is covered on the upper part of the beverage can, the first cutting line and the second cutting line may be formed three-dimensionally in a curved form along the peripheral surface of the periphery cover and along the boundary point between the periphery cover and the lid cover by the perforating part of the cutting line forming part.

Particularly, because the first cutting line and the second cutting line are formed during the process that the beverage can simply passes the cutting line forming part, the first cutting line and the second cutting line of the three-dimensional structure can be formed easily, rapidly and consecutively, thereby facilitating mass production.

Moreover, because the perforating part is formed on the inner surface of the support plate along the virtual route (13) where the first and second cutting lines are deployed and the beverage can is rotated and moved in the state where the beverage can gets in contact with the inner surface of the support plate, the perforating part and the vinyl cover are continuously in contact with each other so that holes are formed at predetermined intervals along the peripheral surface of the periphery cover and the boundary point between the periphery cover and the lid cover by the perforating part, thereby easily forming the first and second cutting lines of a three-dimensional form.

Furthermore, because the curved portion of the support plate corresponds with the edge line of the beverage can and the beverage can is moved in the state where they are in close contact with each other, perforated points by the perforating part may be accurately formed along the formation route of the first and second cutting lines.

Additionally, because the perforating part is made in the form of the electrical heating lines or the cutting blades, the structure of the perforating part for forming the first and second cutting lines three-dimensionally is not complicated.

DETAILED DESCRIPTION OF THE INVENTION

Reference will be now made in detail to preferred embodiments of the present invention with reference to the attached drawings.

Figure 1:
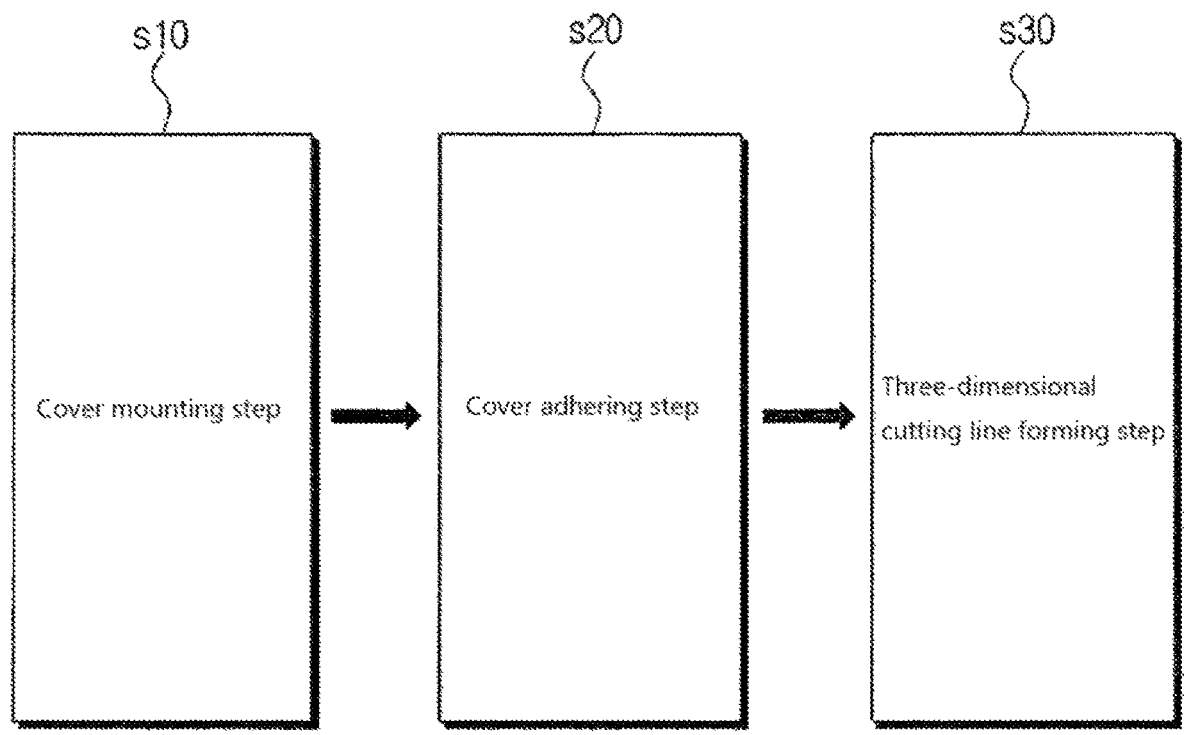
FIG. 1 is a flow chart showing the entire process.
Figure 2:
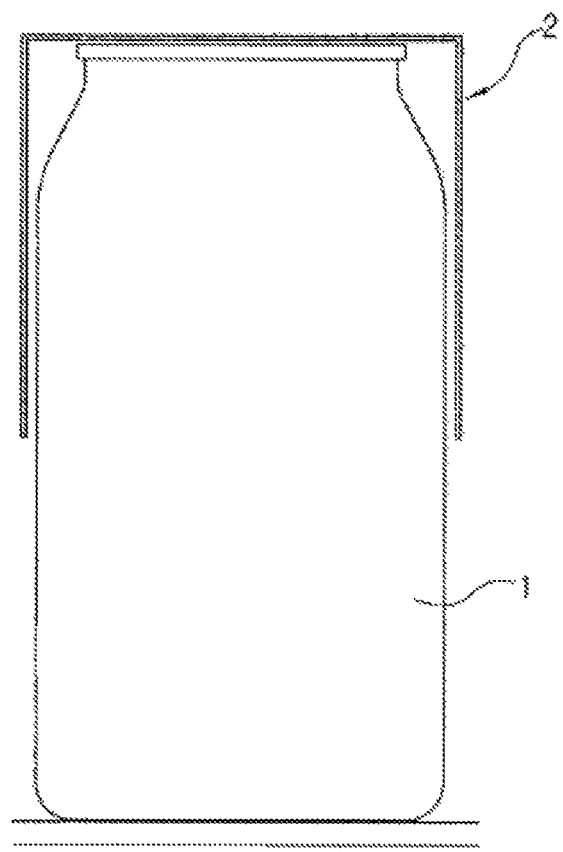
FIG. 2 is a schematic diagram showing a cover mounting step.
Figure 3:
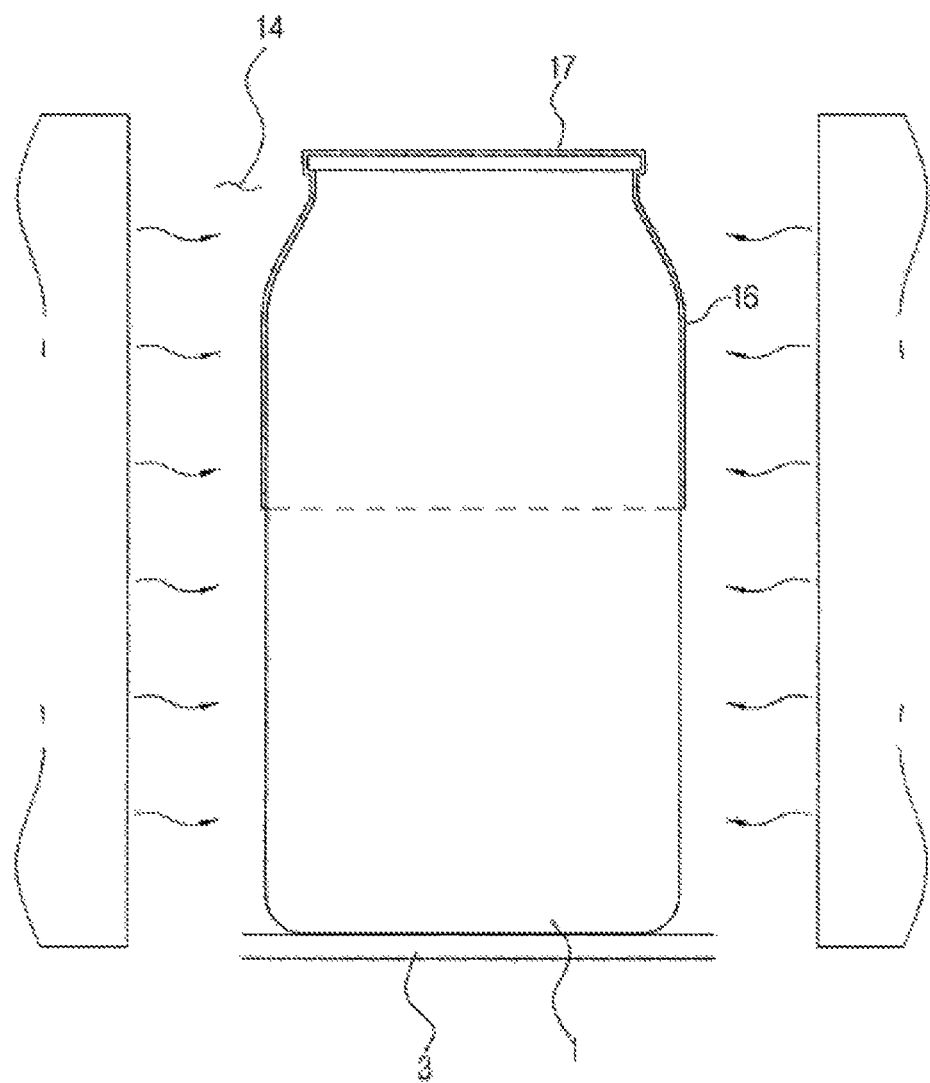
FIG. 3 is a schematic diagram showing a cover adhering step.

As shown in FIG. 1, a method for manufacturing a sanitary cover for a beverage can according to an embodiment of the present invention includes a cover mounting step (S10), a cover adhering step (S20), and a three-dimensional cutting line forming step (S30).

For your reference, contents of well-known skills, such as an initial preparing step of a vinyl cover 2 and a sterilizing step, will be omitted.

The cover mounting step (S10) is to cover a vinyl cover 2, which will be used as a sanitary cover, on an initial beverage can 1. The vinyl cover 2 is opened at a lower end portion and other portions are enclosed. The vinyl cover 2 which is located above the beverage can 1 drops down by a lifting device (not shown), so that an upper end portion of the beverage can 1 is inserted into the vinyl cover through the lower end portion of the vinyl cover 2.

Therefore, the vinyl cover 2 covers and surrounds from the upper end portion of the beverage can 1 to the peripheral surface near the middle portion of the beverage can.

After the cover mounting step (S10), the cover adhering step (S20) is carried out.

The cover adhering step (S20) is to firmly adhere the vinyl cover 2, which covers the upper portion of the beverage can 1, to the surface of the beverage can in order to enhance unity of the beverage can and minimize inflow of foreign matters between the vinyl cover 2 and the surface of the beverage can 1.

The beverage can 1 on which the vinyl cover 2 is covered is moved through a conveyer belt 3 to be located inside a heating space 14. Then, hot air is supplied from all directions or air around the beverage can is heated through a heater.

The entire vinyl cover 2 is firmly adhered onto the surface of the beverage can while being contracted by heating, so that unity between the beverage can 1 and the vinyl cover 2 is enhanced.

For reference, besides the above, the cover adhering step (S20) may be applied in various ways if the entire vinyl cover 2 is firmly adhered onto the surface of the beverage can to enhance unity of the vinyl cover 2 and the beverage can and prevent inflow of foreign matters.

After the cover adhering step (S20), the three-dimensional cutting line forming step (S30) is carried out.

The three-dimensional cutting line forming step (S30) is a step to three-dimensionally form a first cutting line 9 and a second cutting line 10 on the vinyl cover in order to remove the vinyl cover when a user uses the beverage can later. So, the three-dimensional cutting line forming step (S30) is to enhance convenience in use of the vinyl cover and improve quality of products.

Basically, when the beverage can 1 firmly covered with the vinyl cover 2 passes a cutting line forming part 4 while rotating by a rotationally transferring part 15, the second cutting line 10 is automatically formed on the peripheral surface of the periphery cover 16 surrounding the upper peripheral surface of the beverage can 1, and at the same time, the first cutting line 9 is automatically formed along a boundary point between the lid cover 17 and the periphery cover 16, which surround the upper surface of the beverage can 1, namely, along the top edge of the beverage can.

In more detail, the method for manufacturing the sanitary cover for the beverage can according to the preferred embodiment of the present invention will be described.

The cutting line forming part 4 used in the three-dimensional cutting line forming step (S30) includes a support plate 5 and perforating parts 7.

Figure 4:
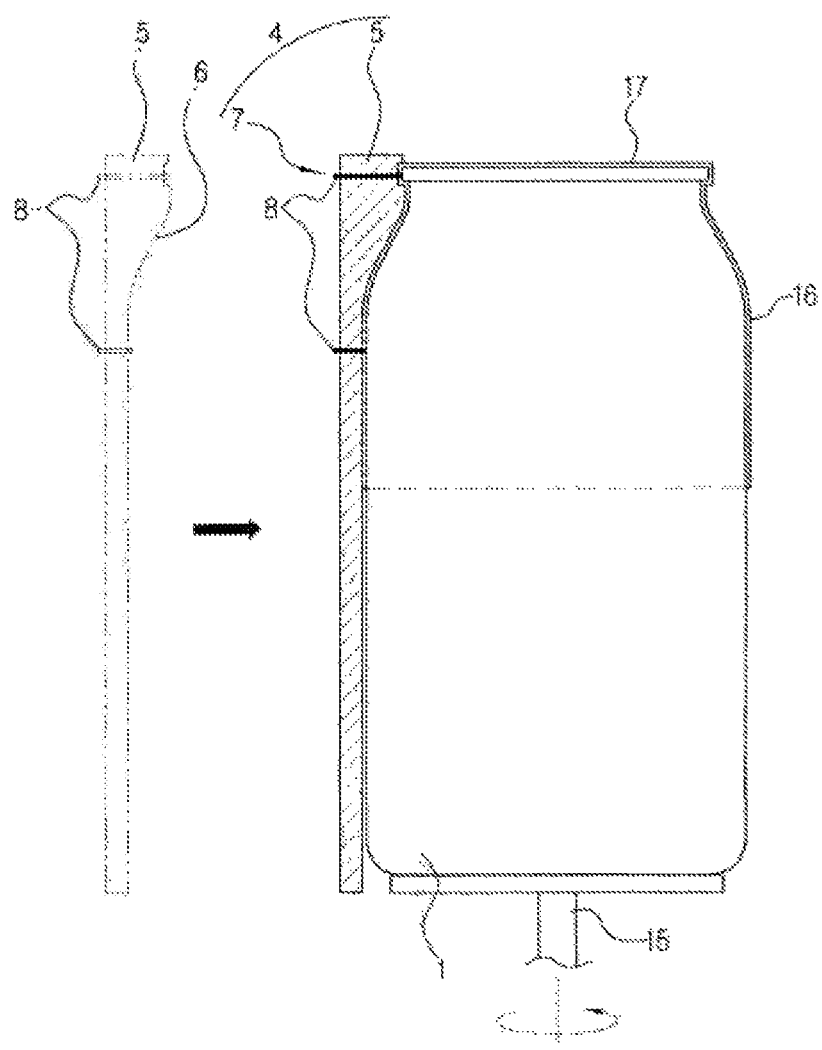
FIG. 4 is a front view showing a three-dimensional cutting line forming step.
Figure 5:
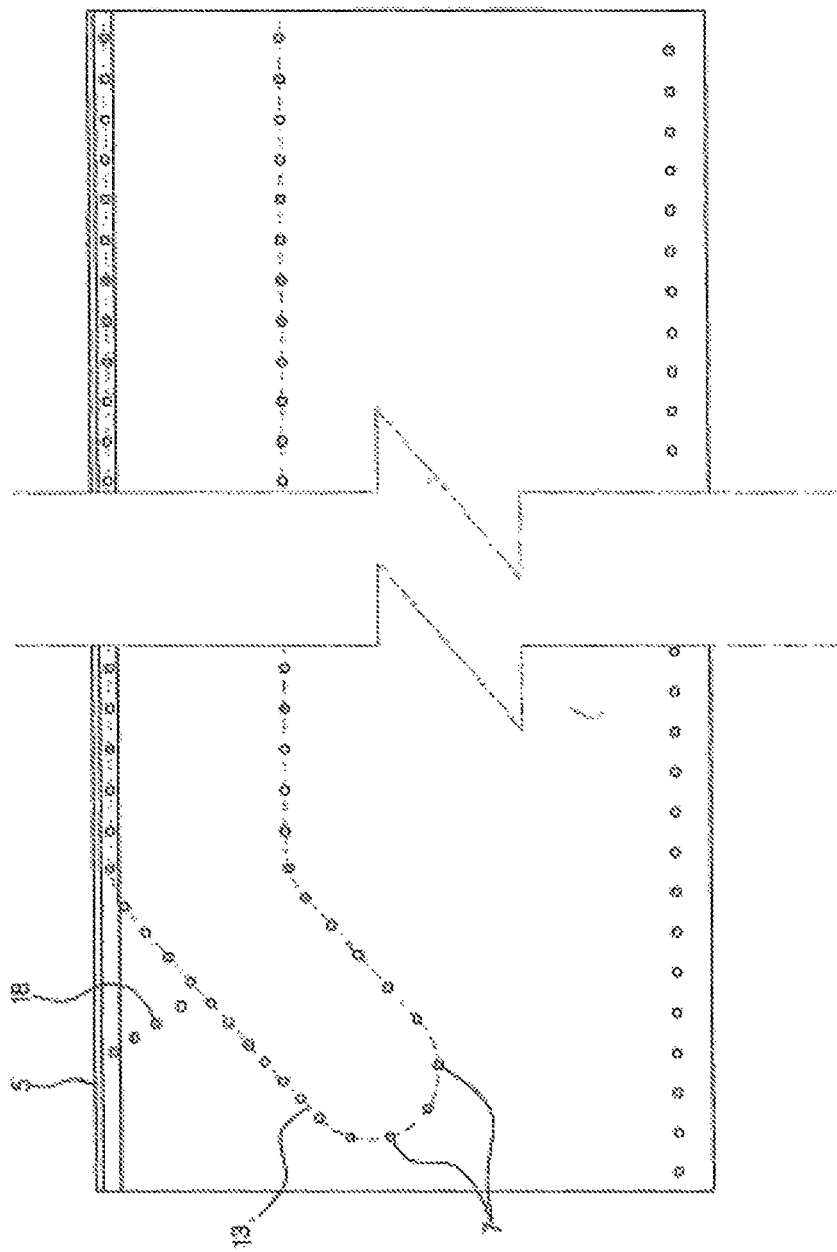
FIG. 5 is a side view of FIG. 4.

The support plate 5 serves to fasten the beverage can 1 at a stable position and to support the perforating parts 7, which will be described later, when the first cutting line 9 and the second cutting line 10 are formed on the surface of the vinyl cover 2. As shown in FIGS. 4 and 5, the support plate 5 is a plate having a front-and-rear length and has a curved portion 6 formed on the inner surface to have the same shape as the vertical edge line of one side of the beverage can 1 in the cross section.

Moreover, the perforating parts 7 serve to form the first cutting line 9 and the second cutting line 10 on the vinyl cover 2 by touching and perforating the vinyl cover 2. In the embodiment illustrated in FIGS. 4 and 5, the perforating parts 7 are made in the form of electrical heating lines 8, which generate heat by electricity, and the electrical heating lines 8 are arranged to be spaced apart from each other at a predetermined interval and exposed on the inner surface of the support plate 5 along a virtual route 13 where the first cutting line 9 and the second cutting line 10, which will be formed on the vinyl cover 2, are deployed on a plane.

Each of the electrical heating lines 8 is arranged along a route of a planar figure form that the first cutting line 9 and the second cutting line 10, which will be formed on the inner surface of the support plate 5 in a curved form along the peripheral surface of the vinyl cover 2, are deployed on a plane.

In the above state, the beverage can 1, which is seated on the rotationally transferring part 15, is transferred toward the front while rotating by the rotationally transferring part 15 in a state where an edge line of one side gets in close contact with the curved portion 6 of the support plate 5.

During the above step, the peripheral surface of the periphery cover 16 of the vinyl cover 2 covering the beverage can 1 and the boundary point between the periphery cover 16 and the lid cover 17 repeatedly come into contact with the electrical heating lines 8 on the inner surface of the support plate 5, which are arranged to correspond to the peripheral surface and the boundary point.

Therefore, the points of the vinyl cover 2 that get in contact with the electrical heating lines 8 are melted and perforated by heat of the electrical heating lines 8, and such perforated points are formed along the route of the vinyl cover 2, on which the first cutting line 9 and the second cutting line 10 will be formed.

Figure 7:
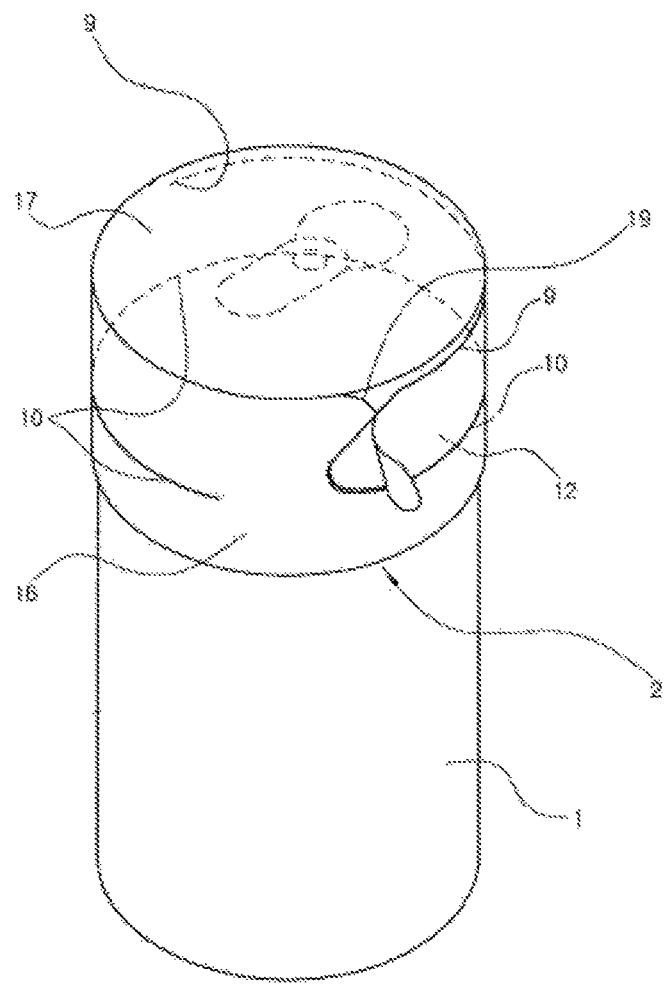
FIG. 7 is a perspective view showing a completed state of a sanitary cover.
Figure 8:
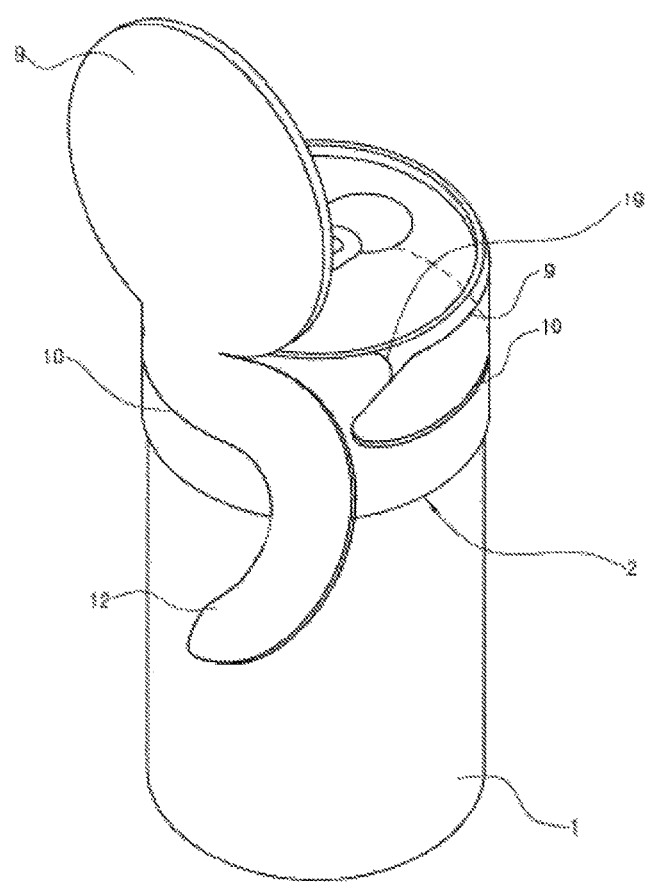
FIG. 8 is a perspective view showing a state where a lid is tilted during a step of cutting the sanitary cover.

After the three-dimensional cutting line forming step (S30), as shown in FIG. 7, the sanitary cover is completed such that the 15 second cutting line 10 is formed in a circle along the peripheral surface from one side of the peripheral surface of the periphery cover 16 but is formed only near to the start point of the second cutting line 10, and the first cutting line 9 is formed in a circle along the boundary point between the periphery cover 16 20 and the lid cover 17 but is formed only to the opposite point of the start point of the first cutting line 9.

Because the first cutting line 9, which functions to separate the lid cover 17 from the periphery cover 16, is formed to be shorter than the second cutting line 10 through the above structure, when the user holds and tears off the section between the start point of the first cutting line 9 and the start point of the second cutting line 10, out of the cutting band 12 formed between the first cutting line 9 and the second cutting line 10 of the vinyl cover 2, the vinyl cover 2 is cut along the first cutting line 9 and the second cutting line 10. In the above process, because the first cutting line 9 is formed to be shorter than the second cutting line 10, the lid cover 17 is not completely separated from the periphery cover 16 and maintains the integrated state.

Therefore, the sanitary cover is not completely separated from the beverage can 1 when the sanitary cover is cut for use.

Furthermore, when the user tears off the cutting band 12, because the first cutting line 9 is cut along the boundary points between the lid cover 17 and the periphery cover 16, namely, along the upper end edge of the beverage can 1, the lid cover 17 is naturally upraised and tilted while the user tears off the cutting band 12.

For your reference, because the perforating parts 7 in the form of the electrical heating lines 8 to form the first cutting line 9 and the second cutting line 10 penetrate the support plate 5 in zigzags along the virtual route 13 that the first cutting line 9 and the second cutting line 10 are deployed on the inner surface of the support plate 5, the electrical heating lines 8 are exposed on the inner surface of the support plate 5 at a predetermined interval from each other.

Of course, besides the above structure, the perforating parts 7 in the form of the electrical heating lines 8 may be applied in various ways if the beverage can gets in contact with the surface of the vinyl cover 2 and perforation is achieved smoothly at the contact points while the beverage can is moved.

Figure 6:
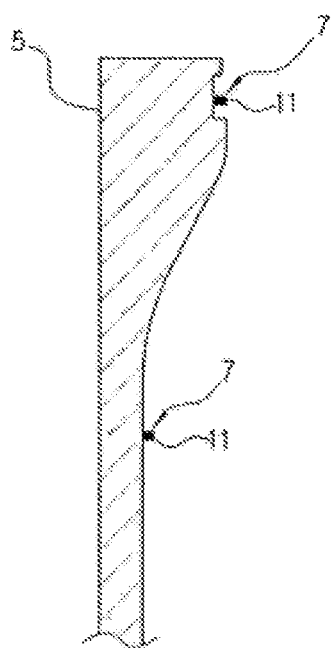
FIG. 6 is a plan view showing perforating parts according to another embodiment of the present invention.

For instance, FIG. 6 illustrates an embodiment that the perforating parts 7 are made in the form of cutting blades 11 not in the form of the electrical heating lines 8. As shown in the drawing, a plurality of the cutting blades 11 are protrudingly arranged to be spaced apart from each other at a predetermined interval along the virtual route 13 of the inner surface of the support plate 5, on which the first cutting line 9 and the second cutting line 10 are deployed.

Therefore, the cutting blades 11 get in contact with the surfaces of the periphery cover 16 and the lid cover 17 and the contact points are cut and perforated by the cutting blades 11 while the beverage can 1 rotates and moves toward the front.

For your reference, in the above state, an auxiliary cutting part 18 for cutting around the start point of the first cutting line may be further formed from the start point of the first cutting line to the vicinity of the start point of the first cutting line of the boundary point between the periphery cover and the lid cover 17 of the virtual route 13, on which the first cutting line 9 and the second cutting line 10 are deployed.

By the auxiliary cutting part 18, on the vinyl cover, an auxiliary cutting line 19 is formed in a section rising from the start point of the first cutting line 9 to the boundary point between the periphery cover 16 and the lid cover 17, wherein one end portion connected with the first cutting line 9 is cut in the opposite direction to a formation direction of the first cutting line 9 and the other end portion is located at the boundary point between the lid cover 17 and the periphery cover 16.

As described above, because the auxiliary cutting line 19 is formed on the vinyl cover 2, while the user tears off the cutting band of the sanitary cover, the power applied to the tearing start point is concentrated on the start point of the first cutting line 9 to prevent power from being dispersed to other points, so that the user can exactly tear off the cutting band 12 along the first cutting line 9 and the second cutting line 10.

<Explanation of reference numerals in drawings>

S10: cover mounting step  S20: cover adhering step
S30: three-dimensional cutting line forming step
1: beverage can         2: vinyl cover
3: conveyer belt        4: cutting line forming part
5: support plate        6: curved part
7: perforating part     8: electrical heating line
9: first cutting line   10: second cutting line
11: cutting blade       12: cutting band
13: virtual route       14: heating space
15: rotationally transferring part
16: periphery cover     17: lid cover
18: auxiliary cutting part  19: auxiliary cutting line

The invention claimed is:

1. A method for manufacturing a sanitary cover for a beverage can comprising:
a cover mounting step of covering the beverage can with a vinyl cover, which is opened at a lower end portion and enclosed in all directions except the lower end portion, from an upper end portion to a middle portion of the beverage can;
a cover adhering step of contracting the entire vinyl cover by heating the covered vinyl cover so as to be adhered on a surface of the beverage can; and
a three-dimensional cutting line forming step of forming a first cutting line perforated at predetermined intervals along a boundary point between a lid cover and a periphery cover of the vinyl cover, which cover an upper surface of the beverage can, and a second cutting line perforated at predetermined intervals along a peripheral surface of the periphery cover, which surrounds a peripheral surface of the beverage can, by a cutting line forming part while the beverage can and the vinyl cover move and pass through the cutting line forming part,
wherein in the cutting line forming step, the second cutting line is formed in a circle along the peripheral surface of the beverage can from one side of the peripheral surface of the periphery cover but is formed only near to the cutting line forming part, and the first cutting line is formed in a circle along the boundary point between the periphery cover and the lid cover but is formed only to an opposite point of a start point of the first cutting line,
wherein the cutting line forming part comprises:
a support plate, which is a plate having a front-and-rear length and has a curved portion formed on an inner surface to have a same shape as a vertical edge line of one side of the beverage can; and
a perforating part formed on the inner surface of the support plate along a virtual route where the first cutting line and the second cutting line, which will be formed on the vinyl cover, are deployed on a plane,
wherein one side edge of the beverage can comes into contact with the inner surface of the support plate, the beverage can rotates in the state where a side edge of the beverage can gets in contact with a curved part, and the perforating part perforates the surfaces of the periphery cover and the lid cover so that holes are formed along formation routes of the first cutting line and the second cutting line at predetermined intervals.

2. The sanitary cover manufacturing method according to claim 1, wherein the perforating part is formed such that electrical heating lines are arranged on the inner surface of the support plate to be spaced apart from each other at a predetermined interval along a virtual route (13) where the first and second cutting lines are deployed and to be exposed, and
wherein the heating lines come into contact with the surface of the periphery cover and the surface of the lid cover while the beverage can rotates, and contact points are melted and perforated by heat.

3. The sanitary cover manufacturing method according to claim 2, wherein the electrical heating lines perforate the inner surface of the support plate in zigzags along the virtual route (13) where the first and second cutting lines are deployed.

4. The sanitary cover manufacturing method according to claim 1, wherein the perforating part is made in the form of cutting blades, and the cutting blades are protrudingly arranged on the inner surface of the support plate to be spaced apart from each other at a predetermined interval along a virtual route (13) where the first and second cutting lines are deployed, and
wherein the cutting blades come into contact with the surface of the periphery cover and the surface of the lid cover while the beverage can rotates, and contact points are cut and perforated by the cutting blades.

5. The sanitary cover manufacturing method according to claim 4, wherein the perforating part has an auxiliary cutting part for cutting around the start point of the first cutting line, and the auxiliary cutting part is formed from the start point of the first cutting line to a vicinity of the start point of the first cutting line of the boundary point between the periphery cover and the lid cover.

* * * * *